United States Patent Office.

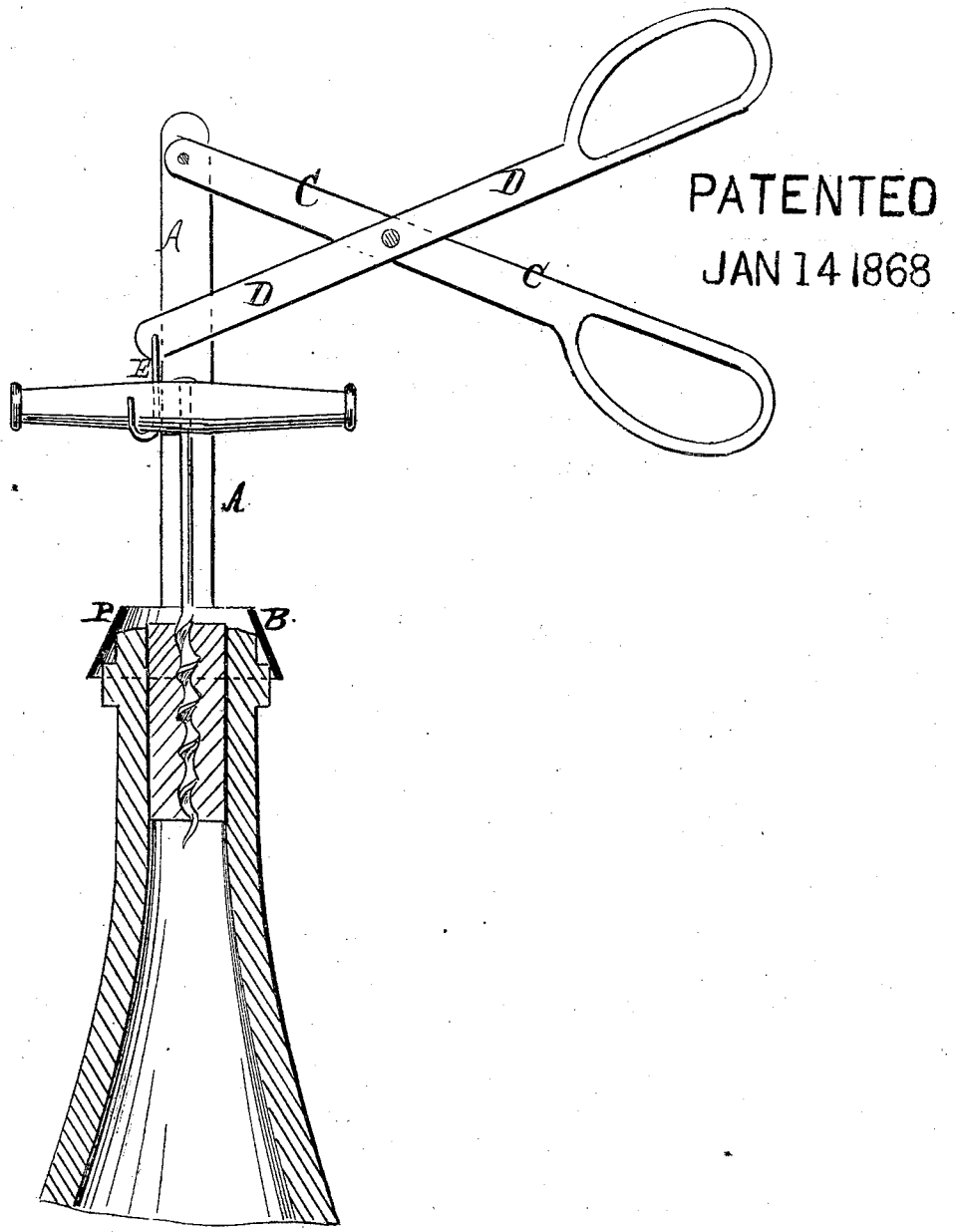

JAMES MORTON, OF PHILADELPHIA, PENNSYLVANIA.

Letters Patent No. 73,370, dated January 14, 1868.

IMPROVED CORK-EXTRACTOR.

*The Schedule referred to in these Letters Patent and making part of the same.*

TO ALL WHOM IT MAY CONCERN:

Be it known that I, JAMES MORTON, of Philadelphia, in the county of Philadelphia, and State of Pennsylvania, have invented a new and improved Cork-Extractor; and I do hereby declare that the following is a full, clear, and exact description thereof, which will enable others skilled in the art to make and use the same, reference being had to the accompanying drawings, forming part of this specification.

The drawing represents a side view of my improved cork-screw extractor.

This invention relates to a new device for extracting the cork-screw, with the cork, from the neck of a bottle, and consists of three bars, of which one has a socket or cap fitted to its lower end, to be placed upon and around the upper end of the bottle. Near the upper end of this first post or bar is pivoted the end of the second bar, near the middle of which the third bar is pivoted, at or near its middle. The second and third bars are provided with handles at their outer ends, and to the inner end of the third bar is secured a hook. Double lever-power is thus produced, as the third bar can either be turned on its own pivot, or, in conjunction with the second bar, around the pin, by which the same is secured to the post, and the cork will thus be easily extracted from the bottle.

A represents a bar, made of metal or other suitable material, and provided with a tapering ring, B, at its lower end, by means of which it can be set upon a bottle, as shown. C represents a bar, made of metal or other suitable material, and pivoted, at or near one end, to the upper end of the bar A. The bar C is or may be provided with a handle at its free end, as shown. To the bar C is pivoted another similar bar, D, the pivoting-pin passing through near the centre of either bar, as shown. On that end of the bar D which is near to the post A is formed or secured a hook, E, as shown. This hook is, when the post A is secured to the bottle, as shown, fitted through the eye or around the shank of the cork-screw, and then, by raising the end of the bar C, and by, at the same time, depressing the free end of the bar D, the hook will be elevated with double-lever power, and the cork will be easily extracted.

This instrument can be used with equal advantage for extracting corks on which hooks or rings are already formed, so that no cork-screw will be employed.

I claim as new, and desire to secure by Letters Patent—

A double-lever cork-extractor, consisting of the bars A, C, and D, all made and operating substantially as herein shown and described.

JAMES MORTON.

Witnesses:
REBECCA E. MORTON,
SAMUEL C. OGLE.